US006901363B2

(12) United States Patent
Balan et al.

(10) Patent No.: US 6,901,363 B2
(45) Date of Patent: May 31, 2005

(54) METHOD OF DENOISING SIGNAL MIXTURES

(75) Inventors: Radu Victor Balan, Levittown, PA (US); Scott Thurston Rickard, Jr., Princeton, NJ (US); Justinian Rosca, Princeton Junction, NJ (US)

(73) Assignee: Siemens Corporate Research, Inc., Princeton, NJ (US)

(*) Notice: Subject to any disclaimer, the term of this patent is extended or adjusted under 35 U.S.C. 154(b) by 469 days.

(21) Appl. No.: 09/982,497

(22) Filed: Oct. 18, 2001

(65) Prior Publication Data

US 2003/0097259 A1 May 22, 2003

(51) Int. Cl.[7] ......................... G01L 21/02; G01L 11/02; H04B 15/00

(52) U.S. Cl. ...................... 704/226; 704/233; 381/94.3; 381/94.7

(58) Field of Search ......................... 704/233; 381/94.3, 381/94.7

(56) References Cited

U.S. PATENT DOCUMENTS 6,317,703 B1 11/2001 Linsker ...................... 702/190
6,430,528 B1 * 8/2002 Jourjine et al. ............. 704/200
6,480,823 B1 * 11/2002 Zhao et al. ................. 704/226
6,647,365 B1 * 11/2003 Faller ...................... 704/200.1
6,654,719 B1 * 11/2003 Papadias ..................... 704/233
2002/0042685 A1 * 4/2002 Balan et al. .................. 702/75
2002/0051500 A1 * 5/2002 Gustafsson ................. 375/295
2003/0233213 A1 * 12/2003 Balan et al. ................ 702/180

OTHER PUBLICATIONS

Jourjine, Alexander, Rickard, Scott, Yilmaz, Ozgur. "Blind Separation of Disjoint Orthogonal Signals: Demixing N Sources from 2 Mixtures", IEEE International Conference on Acoustics, Speech and Signal Processing, vol. 5, pp. 2985–2988, Jun. 5–9, 2000.*

Rickard, Scott, Dietrich, Frank. "DOA Estimation of Many W–Disjoint Orthogonal Sources from Two Mixtures Using DUET", Proceedings of the 10th IEEE Workshop on Statistical Signal and Array Processing, pp. 311–314, Aug. 14–16, 2000.*

Soon, V.C., Tong, L., Huang, F., Liu, R. "A Robust Method for Wideband Signal Separation", Circuits and Systems, 1993., ISCAS '93, 1993 IEEE International Symposium on, May 3–6, 1993 pp.: 703–706.*

* cited by examiner

*Primary Examiner*—Talivaldis Ivars Smits
*Assistant Examiner*—Matthew J Sked
(74) *Attorney, Agent, or Firm*—Donald B. Paschburg; F Chau & Associates

(57) ABSTRACT

Disclosed is a method of denoising signal mixtures so as to extract a signal of interest, the method comprising receiving a pair of signal mixtures, constructing a time-frequency representation of each mixture, constructing a pair of histograms, one for signal-of-interest segments, the other for non-signal-of-interest segments, combining said histograms to create a weighting matrix, rescaling each time-frequency component of each mixture using said weighting matrix, and resynthesizing the denoised signal from the reweighted time-frequency representations.

16 Claims, 3 Drawing Sheets

METHOD OF DENOISING SIGNAL MIXTURES

FIELD OF THE INVENTION

This invention relates to methods of extracting signals of interest from surrounding background noise.

BACKGROUND OF THE INVENTION

In noisy environments, many devices could benefit from the ability to separate a signal of interest from background sounds and noises. For example, in a car when speaking on a cell phone, it would be desirable to separate the voice signal from the road and car noise. Additionally, many voice recognition systems could enhance their performance if such a method was available as a preprocessing filter. Such a capability would also have applications for multi-user detection in wireless communication.

Traditional blind source separation denoising techniques require knowledge or accurate estimation of the mixing parameters of the signal of interest and the background noise. Many standard techniques rely strongly on a mixing model which is unrealistic in real-world environments (e.g., anechoic mixing). The performance of these techniques is often limited by the inaccuracy of the model in successfully representing the real-world mixing mismatch.

Another disadvantage of traditional blind source separation denoising techniques is that standard blind source separation algorithms require the same number of mixtures as signals in order to extract a signal of interest.

What is needed is a signal extraction technique that lacks one or more of these disadvantages, preferably being able to extract signals of interest without knowledge or accurate estimation of the mixing parameters and also not require as many mixtures as signals in order to extract a signal of interest.

SUMMARY OF THE INVENTION

Disclosed is a method of denoising signal mixtures so as to extract a signal of interest, the method comprising receiving a pair of signal mixtures, constructing a time-frequency representation of each mixture, constructing a pair of histograms, one for signal-of-interest segments, the other for non-signal-of-interest segments, combining said histograms to create a weighting matrix, rescaling each time-frequency component of each mixture using said weighting matrix, and resynthesizing the denoised signal from the reweighted time-frequency representations.

In another aspect of the method, said receiving of mixing signals utilizes signal-of-interest activation.

In another aspect of the method, said signal-of-interest activation detection is voice activation detection.

In another aspect of the method, said histograms are a function of amplitude versus a function of relative time delay.

In another aspect of the method, said combining of histograms to create a weighting matrix comprises subtracting said non-signal-of-interest segment histograms from said signal-of-interest segment histogram so as to create a difference histogram, and rescaling said difference histogram to create a weighting matrix.

In another aspect of the method, said rescaling of said weighting matrix comprises rescaling said difference histogram with a rescaling function $f(x)$ that maps x to [0,1].

In another aspect of the method, said rescaling function $$f(x) = \begin{Bmatrix} \tanh(x), & x > 0 \\ 0, & x \le 0 \end{Bmatrix}.$$

In another aspect of the method, said rescaling function $f(x)$ maps a largest p percent of histogram values to unity and the remaining values to zero.

In another aspect of the method, said histograms and weighting matrix are a function of amplitude versus a function of relative time delay.

In another aspect of the method, said constructing of a time-frequency representation of each mixture is given by the equation:

$$\begin{bmatrix} X_1(\omega,\tau) \\ X_2(\omega,\tau) \end{bmatrix} = \begin{bmatrix} 1 & \dots & 1 \\ a_1 e^{-i\omega\delta_1} & \dots & a_N e^{-i\omega\delta_N} \end{bmatrix} \begin{bmatrix} S_1(\omega,\tau) \\ \vdots \\ S_N(\omega,\tau) \end{bmatrix} + \begin{bmatrix} N_1(\omega,\tau) \\ N_2(\omega,\tau) \end{bmatrix}$$

where $X(\omega, \tau)$ is the time-frequency representation of x(t) constructed using Equation 4, $\omega$ is the frequency variable (in both the frequency and time-frequency domains), $\tau$ is the time variable in the time-frequency domain that specifies the alignment of the window, $a_i$ is the relative mixing parameter associated with the $i^{th}$ source, N is the total number of sources, $S(\omega, \tau)$ is the time-frequency representation of s(t), $N_1(\omega, \tau)$ or $N_2(\omega, \tau)$ are the noise signals $n_1(t)$ and $n_2(t)$ in the time-frequency domain.

In another aspect of the method, said histograms are constructed according to an equation selected from the group:

$$H_v(m, n) = \sum_{\omega,\tau} |X_1^W(\omega, \tau)| + |X_2^W(\omega, \tau)|, \text{ and}$$

$$H_v(m, n) = \sum_{\omega,\tau} |X_1^W(\omega, \tau)| \cdot |X_2^W(\omega, \tau)|,$$

where $m=\hat{A}(\omega, \tau)$, $n=\hat{\Delta}(\omega, \tau)$, and wherein $\hat{A}(\omega, \tau)=[a_{num}(\hat{a}(\omega, \tau)-a_{min})/(a_{max}-a_{min})]$, and $\hat{\Delta}(\omega, \tau)=[\delta_{num}(\hat{\delta}(\omega, \tau)-\delta_{min})/(\delta_{max}-\delta_{min})]$ where $a_{min}$, $a_{max}$, $\delta_{min}$, $\delta_{max}$ are the maximum and minimum allowable amplitude and delay parameters, $a_{num}$, $\delta_{num}$ are the number of histogram bins to use along each axis, and $[f(x)]$ is a notation for the largest integer smaller than $f(x)$.

Another aspect of the method further comprises a preprocessing procedure comprising realigning said mixtures so as to reduce relative delays for the signal of interest, and rescaling said realigned mixtures to equal power.

Another aspect of the method further comprises a post-processing procedure comprising a blind source separation procedure.

In another aspect of the invention, said histograms are constructed in a mixing parameter ratio plane.

Disclosed is a program storage device readable by machine, tangibly embodying a program of instructions executable by the machine to perform method steps for denoising signal mixtures so as to extract a signal of interest, said method steps comprising receiving a pair of signal mixtures, constructing a time-frequency representation of each mixture, constructing a pair of histograms, one for signal-of-interest segments, the other for non-signal-of-interest segments, combining said histograms to create a weighting matrix, rescaling each time-frequency component of each mixture using said weighting matrix, and resynthesizing the denoised signal from the reweighted time-frequency representations.

Disclosed is a system for denoising signal mixtures so as to extract a signal of interest, comprising means for receiving a pair of signal mixtures, means for constructing a time-frequency representation of each mixture, means for constructing a pair of histograms, one for signal-of-interest segments, the other for non-signal-of-interest segments, means for combining said histograms to create a weighting matrix, means for rescaling each time-frequency component of each mixture using said weighting matrix, and means for resynthesizing the denoised signal from the reweighted time-frequency representations.

DETAILED DESCRIPTION OF PREFERRED EMBODIMENTS

This method extracts a signal of interest from a noisy pair of mixtures. In noisy environments, many devices could benefit from the ability to separate a signal of interest from background sounds and noises. For example, in a car when speaking on a cell phone, the method of this invention is desirable to separate the voice signal from the road and car noise.

Additionally, many voice recognition systems could enhance their performance if the method of the invention were used as a preprocessing filter. The techniques disclosed herein also have applications for multi-user detection in wireless communication.

A preferred embodiment of the method of the invention uses time-frequency analysis to create an amplitude-delay weight matrix which is used to rescale the time-frequency components of the original mixtures to obtain the extracted signals.

The invention has been tested on both synthetic mixture and real mixture speech data with good results. On real data, the best results are obtained when this method is used as a preprocessing step for traditional denoising method of the inventions.

One advantage of a preferred embodiment of the method of the invention over traditional blind source separation denoising systems is that the invention does not require knowledge or accurate estimation of the mixing parameters. The invention does not rely strongly on mixing models and its performance is not limited by model mixing vs. real-world mixing mismatch.

Another advantage of a preferred embodiment over traditional blind source separation denoising systems is that the embodiment does not require the same number of mixtures as sources in order to extract a signal of interest. This preferred embodiment only requires two mixtures and can extract a source of interest from an arbitrary number of interfering noises.

Figure 4:
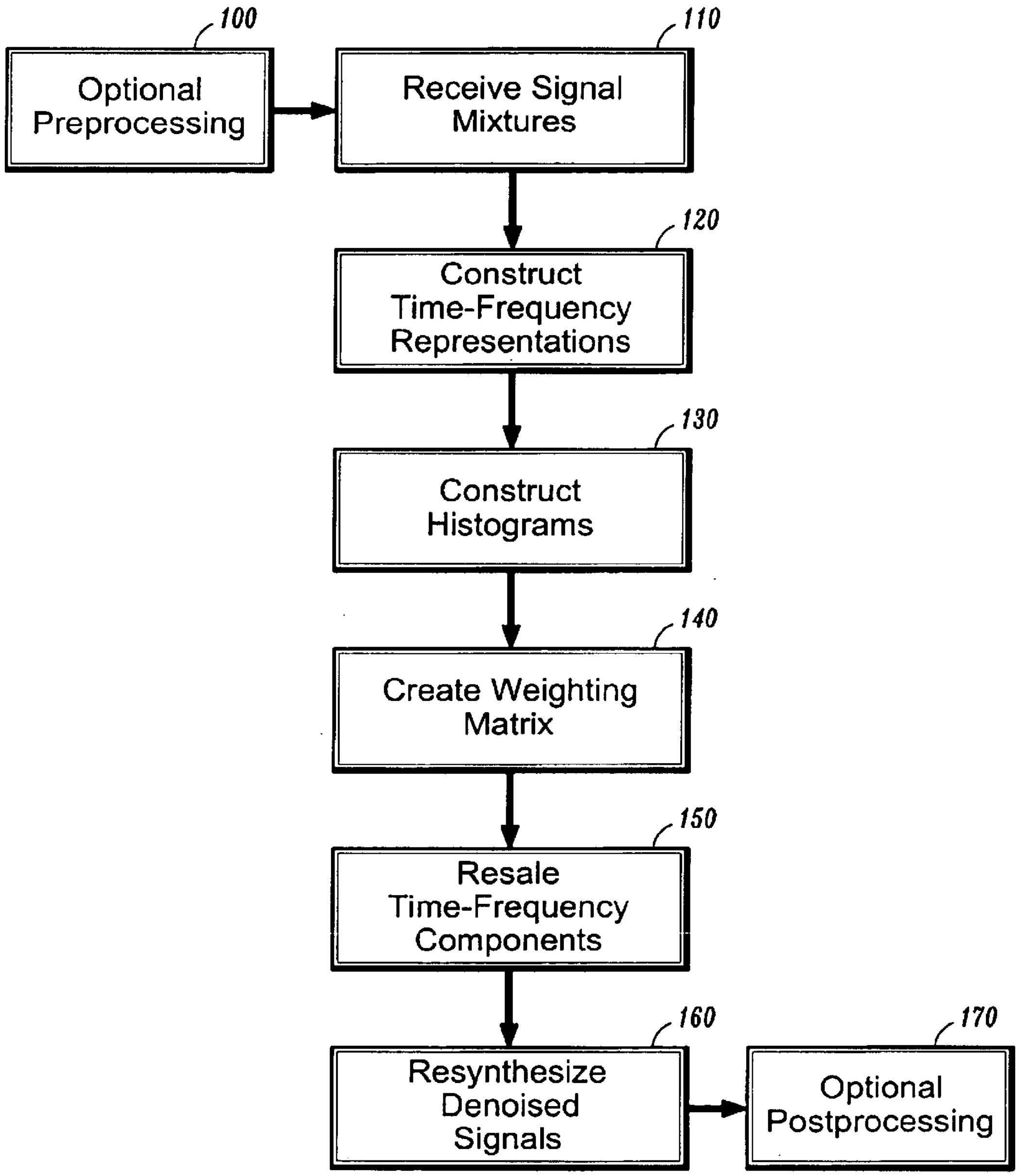
FIG. 4 shows a flowchart of an embodiment of the method of the invention.

Referring to FIG. 4, in a preferred embodiment of the invention, the following steps are executed:

1. Receiving a pair of signal mixtures, preferably by performing voice activity detection (VAD) on the mixtures (node 110).
2. Constructing a time-frequency representation of each mixture (node 120).
3. Constructing two (preferably, amplitude v. delay) normalized power histograms, one for voice segments, one for non-voice segments (node 130).
4. Combining the histograms to create a weighting matrix, preferably by subtracting the non-voice segment (e.g., amplitude, delay) histogram from the voice segment (e.g., amplitude, delay) histogram, and then rescaling the resulting difference histogram to create the (e.g., amplitude, delay) weighting matrix (node 140).
5. Rescaling each time-frequency component of each mixture using the (amplitude, delay) weighting matrix or, optionally, a time-frequency smoothed version of the weighting matrix (node 150).
6. Resynthesizing the denoised signal from the reweighted time-frequency representations (node 160).

Signal of interest activity detection (SOIAD) is a procedure that returns logical FALSE when a signal of interest is not detected and a logical TRUE when the presence of a signal of interest is detected. An option is to perform a directional SOIAD, which means the detector is activated only for signals arriving from a certain direction of arrival. In this manner, the system would automatically enhance the desired signal while suppressing unwanted signals and noise. When used to detect voices, such a system is known as voice activity detection (VAD) and may comprise any combination of software and hardware known in the art for this purpose.

As an example as to how to construct a time-frequency representation of each mixture, consider the following anechoic mixing model:

$$x_1(t) = \sum_{j=1}^{N} s_j(t) + n_1(t) \tag{1}$$

$$x_2(t) = \sum_{j=1}^{N} a_j s_j(t - \delta_j) + n_2(t) \tag{2}$$

where $x_1(t)$ and $x_2(t)$ are the mixtures, $s_j(t)$ for j=1, . . . , N are the N sources with relative amplitude and delay mixing parameters $a_j$ and $\delta_j$, and $n_1(t)$ and $n_2(t)$ are noise. We define the Fourier transform as, $$F(\omega) = \frac{1}{\sqrt{2\pi}} \int_{-\infty}^{\infty} f(t) e^{-i\omega t} dt$$

and then taking the Fourier transform of Equations (1) and (2), we can formulate the mixing model in the frequency domain as, $$\begin{bmatrix} X_1(\omega) \\ X_2(\omega) \end{bmatrix} = \begin{bmatrix} 1 & \dots & 1 \\ a_1 e^{-i\omega\delta_1} & \dots & a_N e^{-i\omega\delta_N} \end{bmatrix} \begin{bmatrix} S_1(\omega) \\ \vdots \\ S_N(\omega) \end{bmatrix} + \begin{bmatrix} N_1(\omega) \\ N_2(\omega) \end{bmatrix} \tag{3}$$

where we have used the property of the Fourier transform that the Fourier transform of s(t-δ) is $e^{-i\omega\delta}S(\omega, \tau)$. We define the windowed Fourier transform of a signal f(t) for a given window function W(t) as, $$F(\omega,\tau)=\frac{1}{\sqrt{2\pi}}\int_{-\infty}^{\infty}W(t-\tau)f(t)e^{-i\omega t}\,dt$$

and assume the above frequency domain mixing (Equation (3)) is true in a time-frequency sense. Then, $$\begin{bmatrix}X_1(\omega,\tau)\\X_2(\omega,\tau)\end{bmatrix}=\begin{bmatrix}1&\dots&1\\a_1e^{-i\omega\delta_1}&\dots&a_Ne^{-i\omega\delta_N}\end{bmatrix}\begin{bmatrix}S_1(\omega,\tau)\\\vdots\\S_N(\omega,\tau)\end{bmatrix}+\begin{bmatrix}N_1(\omega,\tau)\\N_2(\omega,\tau)\end{bmatrix}\quad(4)$$

where $X(\omega,\tau)$ is the time-frequency representation of $x(t)$ constructed using Equation 4, $\omega$ is the frequency variable (in both the frequency and time-frequency domains), $\tau$ is the time variable in the time-frequency domain that specifies the alignment of the window, $a_i$ is the relative mixing parameter associated with the $i^{th}$ source, N is the total number of sources, $S(\omega,\tau)$ is the time-frequency representation of s(t), $N_1(\omega,\tau)$ or $N_2(\omega,\tau)$ are the noise signals $n_1(t)$ and $n_2(t)$ in the time-frequency domain.

The exponentials of Equation 4 are the byproduct of a nice property of the Fourier transform that delays in the time domain are exponentials in the frequency domain. We assume this still holds true in the windowed (that is, time-frequency) case as well. We only know the mixture measurements $x_1(t)$ and $x_2(t)$. The goal is to obtain the original sources, $s_1(t), \ldots, s_N(t)$.

To construct a pair of normalized power histograms, one for signal segments and one for non-signal segments, let us also assume that our sources satisfy W-disjoint orthogonality, defined as:

$$S_i^W(\omega,\tau)S_j^W(\omega,\tau)=0,\ \forall i\neq j,\ \forall\omega,\tau\quad(6)$$

Mixing under disjoint orthogonality can be expressed as:

$$\begin{bmatrix}X_1(\omega,\tau)\\X_2(\omega,\tau)\end{bmatrix}=\begin{bmatrix}1\\a_1e^{-i\omega\delta_1}\end{bmatrix}S_i(\omega,\tau)+\begin{bmatrix}N_1(\omega,\tau)\\N_2(\omega,\tau)\end{bmatrix},\ \text{for some } i.\quad(7)$$

For each $(\omega,\tau)$ pair, we extract an $(a,\delta)$ estimate using:

$$(\hat{a}(\omega,\tau),\hat{\delta}(\omega,\tau))=(|R(\omega,\tau)|,Im(\log(R(\omega,\tau))/\omega))\quad(8)$$

where $R(\omega,\tau)$ is the time-frequency mixture ratio:

$$R(\omega,\tau)=\frac{X_1^W(\omega,\tau)\overline{X_2^W(\omega,\tau)}}{\|X_2^W(\omega,\tau)\|^2}\quad(9)$$

Assuming that we have performed voice activity detection on the mixtures and have divided the mixtures into voice and non-voice segments, we construct two 2D weighted histograms in $(a,\delta)$ space. That is, for each $(\hat{a}(\omega,\tau),\hat{\delta}(\omega,\tau))$ corresponding to a voice segment, we construct a 2D histogram $H_v$ via:

$$H_v(m,n)=\sum_{\omega,\tau}|X_1^w(\omega,\tau)|+|X_2^w(\omega,\tau)|\quad(10)$$

where $m=\hat{A}(\omega,\tau)$, $n=\hat{\Delta}(\omega,\tau)$, and where:

$$\hat{A}(\omega,\tau)=[a_{num}(\hat{a}(\omega,\tau)-a_{min})/(a_{max}-a_{min})]\quad(11a)$$

$$\hat{\Delta}(\omega,\tau)=[\delta_{num}(\hat{\delta}(\omega,\tau)-\delta_{min})/(\delta_{max}-\delta_{min})]\quad(11b)$$

and where $a_{min}$, $a_{max}$, $\delta_{min}$, $\delta_{max}$ are the maximum and minimum allowable amplitude and delay parameters, and $a_{num}$, $\delta_{num}$ are the number of histogram bins to use along each axis, and $[f(x)]$ is a notation for the largest integer smaller than $f(x)$. One may also choose to use the product $|X_1^W(\omega,\tau)X_2^W(\omega,\tau)|$ instead of the sum as a measure of power, as both yield similar results on the data tested. Similarly, we construct a non-voice histogram, $H_n$, corresponding to the non-voice segments.

The non-voice segment histogram is then subtracted from the signal segment histogram to yield a difference histogram $H_d$:

$$H_d=H_v(m,n)/v_{num}-H_n(m,n)/n_{num}\quad(12)$$

Figure 1:
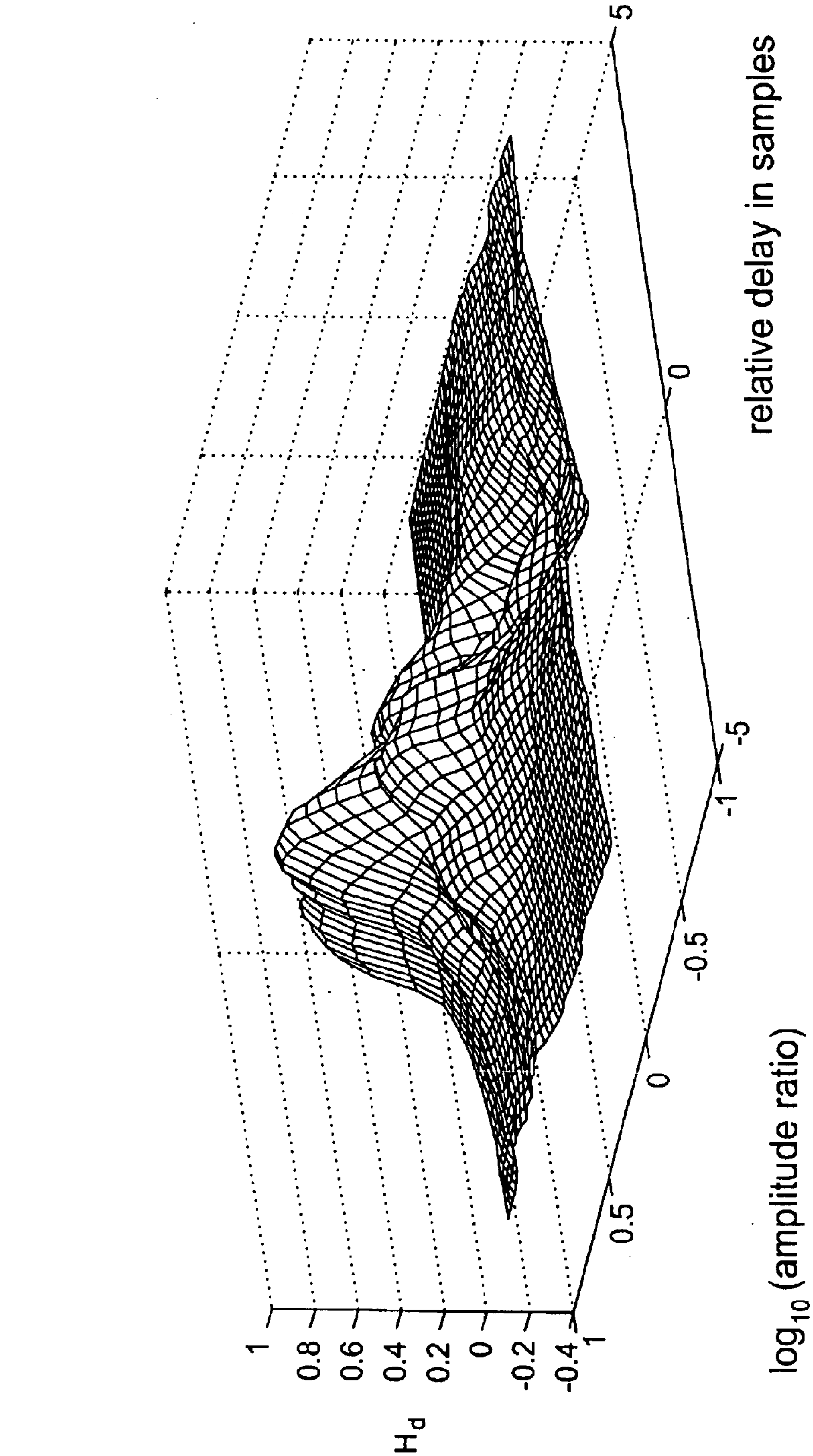
FIG. 1 shows an example of a difference histogram for a real signal mixture.

FIG. 1 shows an example of such a difference histogram for an actual signal, the signal being a voice mixed with the background noise of an automobile interior. The figure shows log of amplitude v. relative delay ratio. Parameter m is the bin index of the amplitude ratio and therefore also parameterizes the log amplitude ratio, n is the bin index corresponding to relative delay.

The difference histogram is then rescaled with a function $f(\ )$, thereby constructing a rescaled (amplitude, delay) weighting matrix $w(m,n)$:

$$w(m,n)=f(H_v(m,n)/v_{num}-H_n(m,n)/n_{num})\quad(13)$$

where $v_{num}$, $n_{num}$ are the number of voice and non-voice segments, and $f(x)$ is a function which maps x to [0,1], for example, $f(x)=\tanh(x)$ for $x>0$ and zero otherwise.

Finally, we use the weighting matrix to rescale the time-frequency components to construct denoised time-frequency representations, $U_1^W(\omega,\tau)$ and $U_2^W(\omega,\tau)$ as follows:

$$U_1^W(\omega,\tau)=w(\hat{A}(\omega,\tau),\hat{\Delta}(\omega,\tau))X_1^W(\omega,\tau)\quad(14a)$$

$$U_2^W(\omega,\tau)=w(\hat{A}(\omega,\tau),\hat{\Delta}(\omega,\tau))X_2^W(\omega,\tau)\quad(14b)$$

which are remapped to the time domain to produce the denoised mixtures. The weights used can be optionally smoothed so that the weight used for a specific amplitude and delay $(\omega,\tau)$ is a local average of the weights $w(\hat{A}(\omega,\tau),\hat{\Delta}(\omega,\tau))$ for a neighborhood of $(\omega,\tau)$ values.

Table 1 shows the signal-to-noise ratio (SNR) improvements when applying the denoising technique to synthetic voice/noise mixtures in two experiments. In the first experiment, the original SNR was 6 dB. After denoising the SNR improved to 27 dB (to 35 dB when the smoothed weights were used). The signal power fell by 3 dB and the noise power fell by 23 dB from the original mixture to the denoised signal (12 dB and 38 dB in the smoothed weight case). The method had comparable performance in the second experiment using a synthetic voice/noise mixture with an original SNR of 0 dB.

TABLE I

| $SNR_x$ | $SNR_u$ | $SNR_{su}$ | $signal_{x\ u}$ | $noise_{x\ u}$ | $signal_{x\ su}$ | $noise_{x\ su}$ |
|---|---|---|---|---|---|---|
| 6 | 27 | 35 | −3 | −23 | −12 | −38 |
| 0 | 19 | 35 | −7 | −26 | −19 | −45 |

Figure 2:
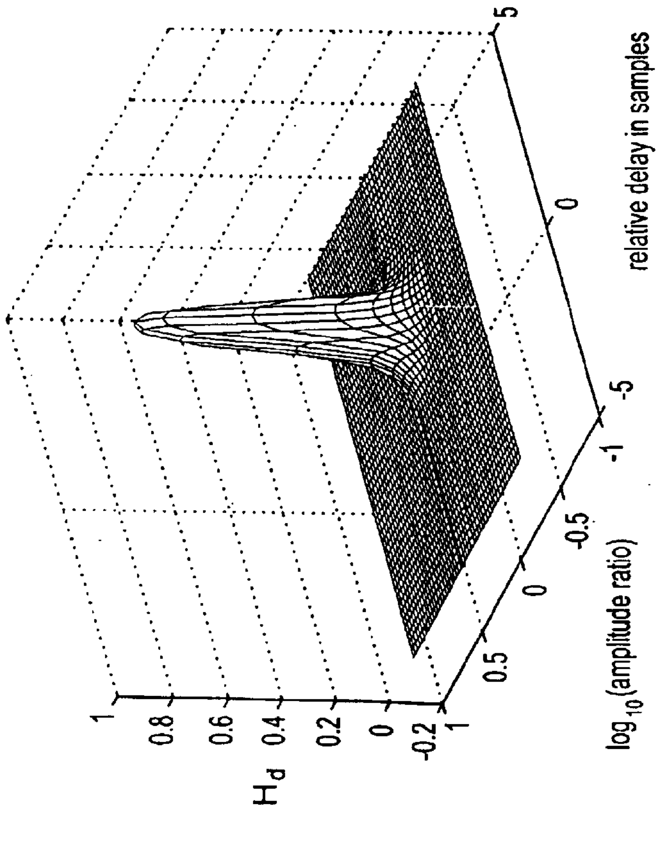
FIG. 2 shows a difference histogram for a synthetic sound mixture.
Figure 3:
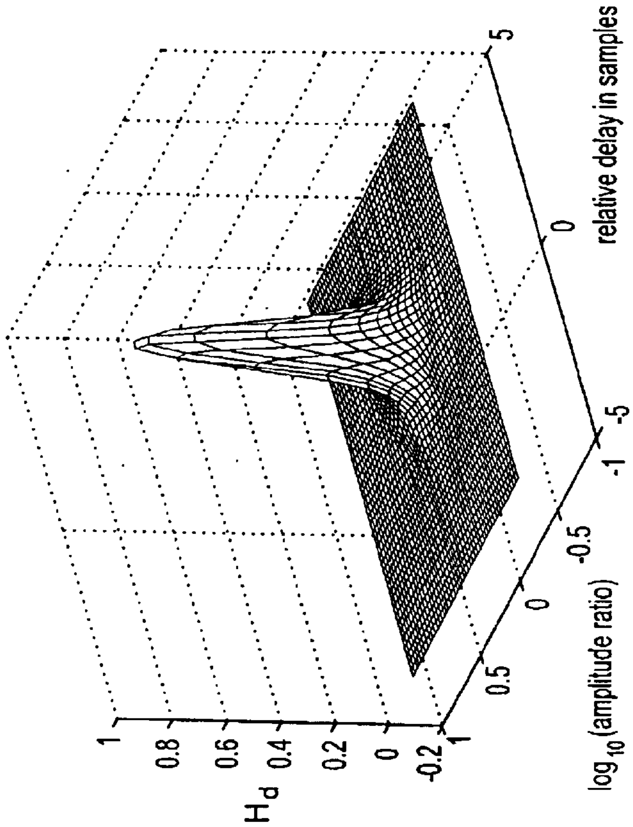
FIG. 3 shows another difference histogram for another synthetic sound mixture.

Referring to FIGS. 2 and 3, FIG. 2 shows the difference histogram $H_d$ for the 6 dB synthetic voice noise mixture of Table I and FIG. 3 shows that of the 0 dB mixture.

There are a number of additional or modified optional procedures that may be used in addition to the methods described, such as the following:

a. A preprocessing procedure may be executed prior to performing the voice activation detection (VAD) of the mixtures. Such a preprocessing method may comprise realigning the mixtures so as to reduce large relative delays $\delta_j$ (see Equation 2) for the signal of interest and rescaling the mixtures (e.g., adjusting $a_j$ from Equation 2) to have equal power (node 100, FIG. 4).

b. Postprocessing procedures may be implemented upon the extracted signals of interest that applies one or more traditional denoising techniques, such as blind source separation, so as to further refine the signal (node 170, FIG. 4).

c. Performing the VAD on a time-frequency component basis rather on a time segment basis. Specifically, rather than having the VAD declare that at time $\tau$ all frequencies are voice (or alternatively, all frequencies are non-voice), the VAD has the ability to declare that, for a given time $\tau$, only certain frequencies contain voice. Time-frequency components that the VAD declared to be voice would be used for the voice histogram.

d. Constructing the pair of histograms for each frequency in the mixing parameter ratio domain (the complex plane) rather than just a pair of histograms for all frequencies in (amplitude, delay) space.

e. Eliminating the VAD step, thereby effectively turning the system into a directional signal enhancer. Signals that consistently map to the same amplitude-delay parameters would get amplified while transient and ambient signals would be suppressed.

f. Using as $f(x)$ a function that maps the largest p percent of the histogram values to unity and sets the remaining values to zero. A typical value for p is about 75%.

The methods of the invention may be implemented as a program of instructions, readable and executable by machine such as a computer, and tangibly embodied and stored upon a machine-readable medium such as a computer memory device.

It is to be understood that all physical quantities disclosed herein, unless explicitly indicated otherwise, are not to be construed as exactly equal to the quantity disclosed, but rather as about equal to the quantity disclosed. Further, the mere absence of a qualifier such as "about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method of denoising signal mixtures so as to extract a signal of interest, the method comprising:

receiving a pair of signal mixtures;

constructing a time-frequency representation of each mixture;

constructing a pair of histograms, one for signal-of-interest segments, the other for non-signal-of-interest segments;

combining said histograms to create a weighting matrix;

rescaling each time-frequency component of each mixture using said weighting matrix; and resynthesizing the denoised signal from the reweighted time-frequency representations.

2. The method of claim 1 wherein said receiving of mixing signals utilizes signal-of-interest activation.

3. The method of claim 2 wherein said signal-of-interest activation detection is voice activation detection.

4. The method of claim 1 wherein said histograms are a function of amplitude versus a function of relative time delay.

5. The method of claim 1 wherein said combining of histograms to create a weighting matrix comprises:

subtracting said non-signal-of-interest segment histograms from said signal-of-interest segment histogram so as to create a difference histogram; and rescaling said difference histogram to create a weighting matrix.

6. The method of claim 5 wherein said rescaling of said difference histogram to create the weighting matrix comprises rescaling said difference histogram with a rescaling function $f(x)$ that maps x to [0,1].

7. The method of claim 6 wherein said rescaling function $f(x)$ is given by the equation:

$$f(x) = \left\{ \begin{array}{ll} \tanh(x), & x > 0 \\ 0, & x \le 0 \end{array} \right\}.$$

8. The method of claim 6 wherein said rescaling function $f(x)$ maps a largest p percent of histogram values to unity and the remaining values to zero.

9. The method of claim 5 wherein said histograms and weighting matrix are a function of amplitude versus a function of relative time delay.

10. The method of claim 1 wherein said constructing of a time-frequency representation of each mixture is given by the equation:

$$\begin{bmatrix} X_1(\omega,\tau) \\ X_2(\omega,\tau) \end{bmatrix} = \begin{bmatrix} 1 & \dots & 1 \\ a_1 e^{-i\omega\delta_1} & \dots & a_N e^{-i\omega\delta_N} \end{bmatrix} \begin{bmatrix} S_1(\omega,\tau) \\ \vdots \\ S_N(\omega,\tau) \end{bmatrix} + \begin{bmatrix} N_1(\omega,\tau) \\ N_2(\omega,\tau) \end{bmatrix}$$

where $X(\omega, \tau)$ is the time-frequency representation of $x(t)$ constructed using the equation for said constructing of a time-frequency representation of each given mixture, $\omega$ is the frequency variable (in both the frequency and time-frequency domains), $\tau$ is the time variable in the time-frequency domain that specifies the alignment of the window, $a_1$ is the relative mixing parameter associated with the $i^{th}$ source, N is the total number of sources, $S(\omega, \tau)$ is the time-frequency representation of $s(t)$, $N_1(\omega, \tau)$ or $N_2(\omega, \tau)$ are the noise signals $n_1(t)$ and $n_2(t)$ in the time-frequency domain.

11. The method of claim 10 wherein said histograms are constructed according to an equation selected from the group:

$$H_v(m,n) = \sum_{\omega,\tau} |X_1^w(\omega,\tau)| + |X_2^w(\omega,\tau)|, \text{ and}$$

$$H_v(m,n) = \sum_{\omega,\tau} |X_1^w(\omega,\tau)| \cdot |X_2^w(\omega,\tau)|,$$

where $m=\hat{A}(\omega, \tau)$, $n=\hat{\Delta}(\omega, \tau)$; and wherein $$\hat{A}(\omega,\tau)=[a_{num}(\hat{a}(\omega,\tau)-a_{min})/(a_{max}-a_{min})], \text{ and}$$

$$\hat{\Delta}(\omega,\tau)=[\delta_{num}(\hat{\delta}(\omega,\tau)-\delta_{min})/(\delta_{max}-\delta_{min})]$$

where $a_{min}$, $a_{max}$, $\delta_{min}$, $\delta_{max}$ are the maximum and minimum allowable amplitude and delay parameters, $a_{num}$, $\delta_{num}$ are the number of histogram bins to use along each axis, and $[f(x)]$ is a notation for the largest integer smaller than $f(x)$.

12. The method of claim 1 further comprising a preprocessing procedure comprising:

realigning said mixtures so as to reduce relative delays for the signal of interest; and rescaling said realigned mixtures to equal power.

13. The method of claim 1 further comprising a postprocessing procedure comprising a blind source separation procedure.

14. The method of claim 1 wherein said histograms are constructed in a mixing parameter ratio plane.

15. A program storage device readable by machine, tangibly embodying a program of instructions executable by the machine to perform method steps for denoising signal mixtures so as to extract a signal of interest, said method steps comprising:

receiving a pair of signal mixtures;

constructing a time-frequency representation of each mixture;

constructing a pair of histograms, one for signal-of-interest segments, the other for non-signal-of-interest segments;

combining said histograms to create a weighting matrix;

rescaling each time-frequency component of each mixture using said weighting matrix; and resynthesizing the denoised signal from the reweighted time-frequency representations.

16. A system for denoising signal mixtures so as to extract a signal of interest, comprising:

means for receiving a pair of signal mixtures;

means for constructing a time-frequency representation of each mixture;

means for constructing a pair of histograms, one for signal-of-interest segments, the other for non-signal-of-interest segments;

means for combining said histograms to create a weighting matrix;

means for rescaling each time-frequency component of each mixture using said weighting matrix; and means for resynthesizing the denoised signal from the reweighted time-frequency representations.

* * * * *